United States Patent [19]

Irikura et al.

[11] Patent Number: 4,579,183
[45] Date of Patent: Apr. 1, 1986

[54] TRANSMISSION FOR SELF-PROPELLED WORKING VEHICLES

[75] Inventors: Koji Irikura, Nishinomiya; Keisaku Hikishima, Kobe; Koichiro Fujisaki, Ashiya, all of Japan

[73] Assignee: Kanzaki Kokyukoki Mfg. Co., Ltd., Amagasaki, Japan

[21] Appl. No.: 700,484

[22] Filed: Feb. 11, 1985

[30] Foreign Application Priority Data

Feb. 20, 1984 [JP] Japan .............................. 59-23557[U]

[51] Int. Cl.⁴ ..................... F16H 37/08; B60K 17/28
[52] U.S. Cl. .................................. 180/53.1; 74/15.6; 180/70.1
[58] Field of Search .................. 180/53.1, 53.6, 53.61, 180/70.1, 75.1; 74/15.6, 15.63, 15.8, 15.2, 11

[56] References Cited

U.S. PATENT DOCUMENTS

| | | | |
|---|---|---|---|
| 4,103,566 | 8/1978 | Kaler et al. | 74/701 |
| 4,304,141 | 4/1980 | Tone et al. | 74/15.2 |
| 4,373,597 | 2/1983 | Itatani et al. | 74/15.63 |

FOREIGN PATENT DOCUMENTS

| | | |
|---|---|---|
| 18749 | 1/1981 | Japan . |
| 909159 | 10/1962 | United Kingdom . |

Primary Examiner—Richard A. Bertsch

[57] ABSTRACT

Transmission for working vehicles having forcedly driven rear wheels (2) as well as rear-PTO shaft (17) and mid-PTO shaft (19) for driving working implements is disclosed. The transmission includes a hydrostatic transmission (7) fixedly provided on the front of transmission case (8) so as to use pump shaft (23) thereof for the input of working implement-driving power at a high level into transmission case (8) from which the rear-PTO shaft (17) extends backwardly at a middle level and so as to permit a low level arrangement of the mid-PTO shaft (19). Within the transmission case (8), clutch means (31, 36) and speed-change means (32) for PTO-line are arranged at an upper half whereas speed-change gearing (43) and differential gearing (44) for vehicle drive line are arranged at a lower half by employing motor shaft (22) of the hydrostatic transmission as input shaft. A compact arrangement of transmission components is achieved so that transmission case (8) may be reduced in length as well as in weight.

5 Claims, 9 Drawing Figures

TRANSMISSION FOR SELF-PROPELLED WORKING VEHICLES

FIELD OF THE INVENTION

This invention relates to a transmission which transmits power in self-propelled working vehicles for use in, by way of examples, earth-moving operation, reaping operation, article-loading operation to transport vehicles and the like.

More particularly, the present invention relates to a transmission for self-propelled working vehicle, wherein left and right rear wheels are driven by enging through a transmission path including therein before a differential gearing for the rear wheels a hydrostatic transmission and speed-change gearing which are connected in series with each other, and wherein there are provided a mid-PTO shaft for driving a working implement of mid-mount type and a rear-PTO shaft for driving a working implement drawn by the vehicle.

PRIOR ART

A transmission which transmits only the vehicle-driving power can be fashioned with ease so that components of such transmission are arranged in a compact manner along a vertical direction so as to be housed by a transmission case which occupies a relatively small length in the longitudinal direction of a vehicle. An example of a transmission of this type is disclosed in U.S. Pat. No. 4,103,566.

Contrarily to this, a transmission which transmits also power for driving working implements can hardly be fashioned to have such compact arrangement of components constituting the transmission. In working vehicles such as tractors for agricultural porposes according to the prior art, a transmission case having a large length in the longitudinal direction of vehicle has thus been employed. Typical examples are shown in U.S. Pat. Nos. 4,304,141 and 4,373,597. In the tractors disclosed in these U.S. patents, transmission case is divided into fronter and rearer cases which are fixedly connected with each other. On the front of transmission case is fixedly arranged a hydrostatic transmission for varying indefinitely the travel speed of vehicle with a selective reverse of travelling direction. In the fronter case is arranged a speed-change gearing for stepwisely varying the travel speed of vehicle as well as another speed-change gearing for stepwisely varying the drive speed of working implements. The former speed-change gearing is disposed within a rearer half of the fronter case and transmits power to a differential gearing which are arranged in the rearer case. The latter speed-change gearing to which power is fed from pump shaft of the hydrostatic transmission is disposed within a fronter half of the fronter case and transmits power through the rearer case to a rear-PTO shaft which extends backwardly from the rearer case for driving a working implement drawn by the vehicle. In the transmission disclosed in U.S. Pat. No. 4,304,141, a mid-PTO shaft for driving a working implement of mid-mount type is further provided which extends forwardly from a separate case fixedly arranged on the bottom of the fronter case. Such mid-PTO shaft is supplied with power also from the PTO speed-change gearing disposed within a fronter half of the fronter case.

A transmission of the type set forth above requires a transmission case which has a large length in the longitudinal direction of vehicle and, therefore, has a large weight. Such transmission case will make the assembling operation of a vehicle hard and also will enlarge the weight of a vehicle. The separate case on the bottom of the fronter transmission case employed in the transmission according to U.S. Pat. No. 4,304,141 for providing a mid-PTO shaft at a low level will decide the lowermost level of transmission case although it is a projection of small size. Because the lowermost level of a transmission case is usually predetermined so that such case will not interfere with projections on the field such as ridges and crops, such separate case will require to equip a transmission case at a higher level.

British Pat. No. 909,159 discloses a transmission mechanism in which components thereof are arranged in a compact fashion so as to reduce length of a transmission case for housing the transmission. This transmission comprises at the front thereof and between primary and secondary shafts a speed-change mechanism using a pair of pulleys each having a variable diameter and an endless belt entrained by the pulleys. A speed-change gearing which is supplied with power from the secondary shaft and transmits power to a differential gearing for vehicle-driving wheels is arranged at an upper half of a space in which the transmission mechanism is arranged, whereas a PTO-clutch mechanism which is supplied with power from the primary shaft and selectively drives one or both of co-axially disposed mid-PTO and rear-PTO shafts is arranged at a lower half of the space.

In the transmission mechanism disclosed in this British Patent, the differential gearing is arranged behind the speed-change gearing and PTO-clutch mechanism referred to above. It is thus considered that, if a single transmission case were employed for housing the transmission mechanism, then a dead space would be produced within the case at a rearer half in which only the differential gearing would be arranged. The co-axial arrangement of mid-PTO shaft and rear-PTO shaft is not preferred, because a working implement of mid-mount type is equipped at a low level whereas a working implement drawn by the tractor is equipped at a higher level so that it is preferred to dispose a rear-PTO shaft at a level higher than the level of a mid-PTO shaft for a smooth transmission of power to such working implements.

OBJECT

Accordingly, a primary object of the present invention is to provide a transmission for self-propelled working vehicles of the type set forth at the beginning in which components thereof are arranged in a compact fashion so as to reduce length and weight of a transmission case for housing same and in which a rear-PTO shaft is provided at a level higher than the level of a mid-PTO shaft without eliminating a compactness of the transmission.

SUMMARY OF THE INVENTION

The present invention provides an improved transmission for a self-propelled working vehicle, wherein left and right rear wheels are driven by engine through a transmission path including therein before a differential gearing for said rear wheels a hydrostatic transmission and speed-change gearing which are connected in series with each other, and wherein there are provided a mid-PTO shaft for driving a working implement of mid-mount type and a rear-PTO shaft for driving a working implement drawn by the vehicle. In such self-propelled working vehicle, the transmission according to the present invention is provided for transmitting power from engine to said rear wheels and to said PTO shafts and is characterized in: that there is provided between said left and right rear wheels a transmission case which supports rotatably at left and right sides thereof the said wheels and which journals said PTO shafts in a fashion such that said mid-PTO shaft extends forwardly from said case at a low level thereof whereas said rear-PTO shaft extends backwardly from said case at a middle level thereof; that said hydrostatic transmission is fixedly arranged on the front of said transmission case at a level above said mid-PTO shaft in a fashion such that hydraulic pump thereof driven by the engine is disposed above hydraulic motor driven by said pump, shafts of said pump and motor being projected into said transmission case; that said speed-change gearing and differential gearing are arranged so as to connect wheel axles of said rear wheels operatively to said motor shaft within said transmission case at a lower half thereof in a fashion such that the former gearing is disposed more forwardly than the latter gearing; and that a PTO-clutch mechanism for selectively continuing and discontinuing transmission of power to said PTO shafts and a speed-change mechanism for said rear-PTO shaft are arranged within said transmission case at an upper half thereof in a fashion such that the former mechanism is disposed more forwardly than the latter mechanism, said PTO-clutch mechanism being drivenly connected to said pump shaft and said mid-PTO shaft and said speed-change mechanism being drivenly connected respectively to said PTO-clutch mechanism.

One of the significant features of the present invention is that hydrostatic transmission is arranged on the front of transmission case in a fashion such that such hydrostatic transmission does not cover a lower level portion of the front of transmission case so that a mid-PTO shaft may extend forwardly from such transmission case at a low level of the case. Another significant feature resides in the arrangement of transmission mechanism within the transmission case that transmission mechanism for PTO-system is disposed at an upper half whereas transmission mechanism for vehicle-driving system is disposed at a lower half. A further significant feature of the invention resides in the structure of transmission mechanism for PTO-system that rear-PTO shaft is driven through a speed-change mechanism with a variable speed of rotation whereas mid-PTO shaft is driven only through a PTO-clutch mechanism at a predetermined speed of rotation.

The transmission mechanism including a PTO-clutch mechanism and speed-change mechanism which are disposed at an upper half within transmission case may be constructed in a simple fashion so that it selectively drives the rear-PTO shaft positioned at a middle level with a variable speed of rotation. Structure permitting a selective change of rotation speed of such rear-PTO shaft is required or at least preferred, because various kinds of working implements such as rotary tiller, rear-mount type mower, grass collector etc. which require to be driven with different speeds of rotation is selectively connected to the rear of vehicle so as to be drawn by the vehicle for various working purposes. Mid-PTO shaft will seldom require a selective change of rotation speed because working implements of mid-mount type equipped to a working vehicle are usually limited in kinds. The mid-PTO shaft driven only through the PTO-clutch mechanism is thus reasonable and makes transmission path for such shaft simpler notwithstanding a low level arrangement of this mid-PTO shaft. The PTO-clutch mechanism disposed more forwardly than the speed-change mechanism also contributes to simplify such transmission path because the mid-PTO shaft is such that is to be disposed at a fronter location within the transmission case.

Left and right rear wheels for driving a vehicle is usually provided at a relatively low level of the vehicle. It is thus seen that the arrangement of transmission mechanism for vehicle-driving system at a lower half within the transmission case is reasonable and contributes to simplify the structure of such transmission mechanism.

In the transmission according to the present invention, a fronter part of the inside of transmission case is occupied by the PTO-clutch mechanism disposed at an upper half and by the speed-change gearing disposed at a lower half whereas a rearer part is occupied by the speed-change mechanism disposed at an upper half and by the differential gearing disposed at a lower half. It is thus seen that the transmission is successfully made compact in a fashion such that there remains no substantial dead space within the transmission case. Such transmission will reduce length of the transmission case in the longitudinal direction of a vehicle. Mid-PTO shaft extending forwardly from the transmission case at a low level will drive in a smooth manner a working implement equipped to a vehicle at a low level, whereas rear-PTO shaft extending backwardly from the transmission case at a middle level of the case will drive in a smooth manner a working implement drawn by a vehicle.

In an embodiment of the present invention, the PTO-clutch mechanism is fashioned such that it includes on a clutch shaft a first clutch for selectively discontinuing the input of power to the clutch shaft and a second clutch for selectively connecting any one or both of the PTO shaft to the clutch shaft. The second clutch is disposed on the clutch shaft more forwardly than the first clutch.

In this case, when the first clutch is operated so as to discontinue the input of power to the clutch shaft both of the mid-PTO shaft and rear-PTO shaft are stopped. Any one or both of the PTO shafts may selectively be driven to rotate by using the second clutch in a condition that the first clutch is engaged. Both of the mid-PTO shaft and rear-PTO shaft are driven to rotate in a case where a working implement of mid-mount type such as mower as well as a working implement drawn by the vehicle such as grass collector should be driven at a time. The arrangement of second clutch at a fronter location contributes to simplify transmission path from such second clutch to the mid-PTO shaft which is to be disposed at a fronter location within the transmission case.

In a further embodiment of the present invention, the second clutch of PTO-clutch mechanism is fashioned such that it includes on the clutch shaft first and second gears at least one of which is selectively connected to such clutch shaft. The first gear is disposed more forwardly than the second gear and is drivingly connected to the mid-PTO shaft through a gear train. The second gear is drivingly connected to the speed-change mechanism for the rear-PTO shaft.

The arrangement of first gear at a fronter location will position the gear train between such first gear and mid-PTO shaft at a fronter location so that axial length of the mid-PTO shaft may be made shorter within the transmission case.

In a still further embodiment of the present invention, an intermediate shaft mounting a co-rotatable gear which is meshed with the second gear of second clutch is provided within the transmission case in a fashion such that it is disposed at a level approximately equal to the level of the clutch shaft but is separated from such clutch shaft in the direction across the transmission case. The speed-change mechanism for the rear-PTO shaft is arranged between such intermediate shaft and rear-PTO shaft.

The arrangement of intermediate shaft at a level approximately equal to the level of clutch shaft having thereon PTO-clutch mechanism contributes to reduce height of the transmission case.

In another embodiment of the present invention, an output shaft for front wheel-driving power is provided within the transmission case in a fashion such that it is disposed opposite to the mid-PTO shaft in a direction across the transmission case with speed-change shaft of the speed-change gearing between and such that it extends forwardly from the transmission case at a level below the hydrostatic transmission. Such output shaft is connected operatively to the speed-change shaft referred to above through a clutch means.

This arrangement of an output shaft which permits a selective drive of left and right front wheels when required or preferred is reasonable because such output shaft and clutch means associated therewith provide no obstacle against the arrangement of mid-PTO shaft and gear train associated therewith.

BRIEF DESCRIPTION OF THE DRAWINGS

Another features of the present invention and its attendant advantages will become readily apparent from the descriptions of the embodiment shown in the drawings in which:

FIG. 7 is a sectional view, partially omitted, taken along line VII—VII of FIG. 3.

DESCRIPTION OF A PREFERRED EMBODIMENT

Figure 1:
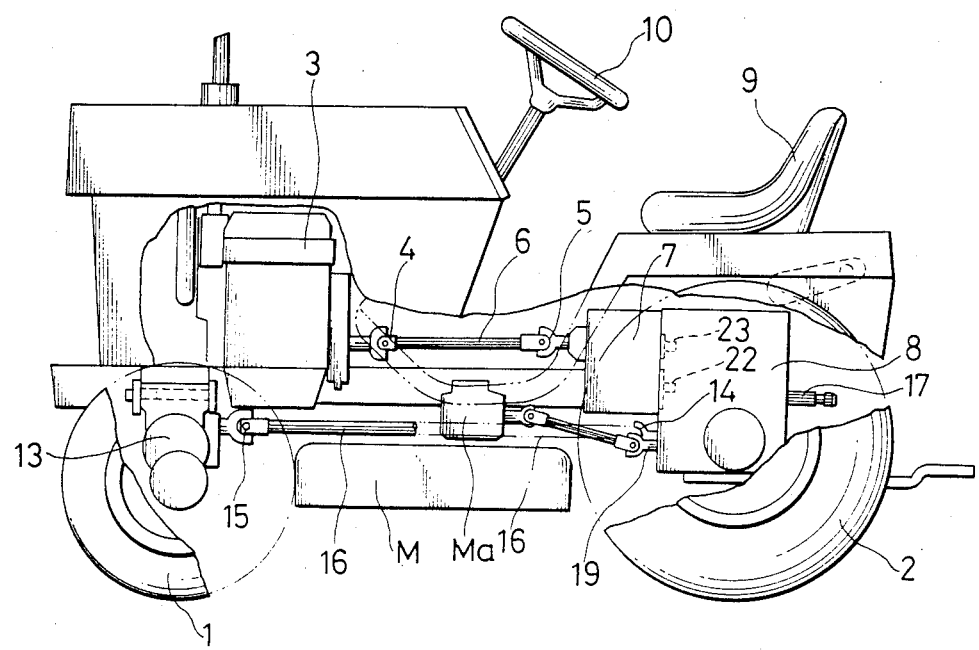
FIG. 1 is a schematic side view, partially cut away, of a self-propelled working vehicle in which an embodiment of the present invention is employed.
Figure 2:
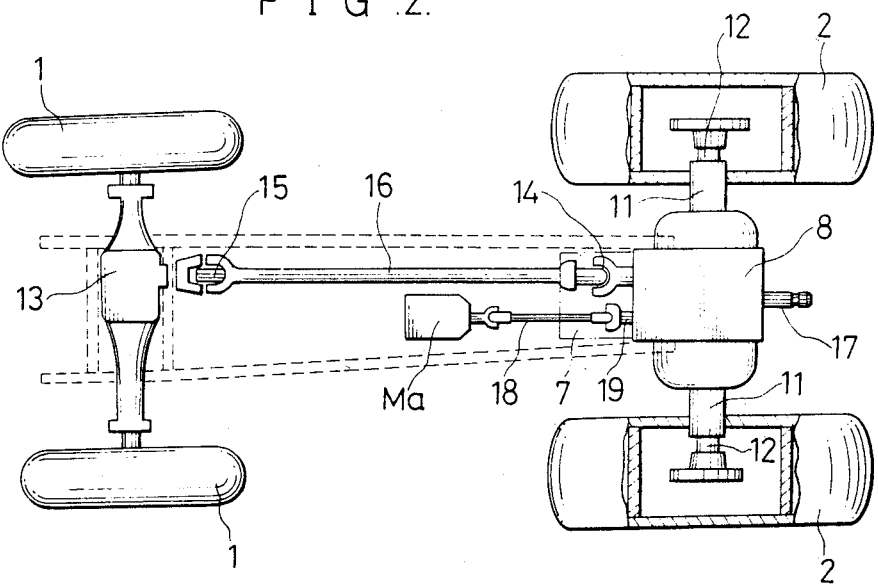
FIG. 2 is a schematic plan view showing arrangement of various components of the vehicle shown in FIG. 1.

As shown in FIGS. 1 and 2, the present invention is embodied in a tractor of relatively small size which is equipped with a mower M of mid-mount type between a pair of front wheels 1 and a pair of rear wheels 2 and below the vehicle frame structure. Engine 3 is mounted on a front end portion of vehicle frame structure. Transmission mechanism to which power is fed from the engine 3 through transmission shaft 6 having at both ends flexible joints 4 and 5 is arranged at a rear end portion of the vehicle and between the left and right rear wheels 2. This transmission mechanism comprises hydrostatic transmission 7 disposed at a fronter side of transmission mechanism and transmission in a transmission case 8 disposed at a rearer side of transmission mechanism. Power is transmitted from transmission shaft 6 to hydropstatic transmission 7 and then from hydrostatic transmission 7 into transmission case 8. Seat 9 is equipped at an upper position of rear end portion of the vehicle frame structure. As is conventional, the vehicle is steered by an operator on the seat 9 by means of steering handle 10 for providing a turn of the left and right front wheels 1.

The tractor shown is constructed as a four-wheeled tractor which is travelled by driving left and right rear wheels 2 and, when preferred or required, by also driving left and right front wheels 1. For driving rear wheels 2, left and right wheel axles 12 are supported by left and right axle housings 11 fixedly provided to the left and right sides of transmission case 8 so that driving power is transmitted from the inside of the case 8 directly to the left and right rear wheels 2. For a selective drive of front wheels 1, a transmission shaft 16 having at its ends flexible joints 14 and 15 is provided which transmits power from a lower portion of the inside of transmission case 8 into a front axle case 13. This transmission shaft 16 is driven to rotate selectively through a front wheel-driving clutch arranged within the case 8. As PTO (power take-off) shafts, there are provided a rear-PTO shaft 17 which extends backwardly from the transmission case 8 for driving a working implement selectively connected to the rear of vehicle so as to be drawn by the vehicle and a mid-PTO shaft 19 which extends forwardly from the transmission case 8 at a low level for transmitting power to a gear box Ma for the mower M through a transmission shaft 18 having flexible joints at both ends.

Figure 3:
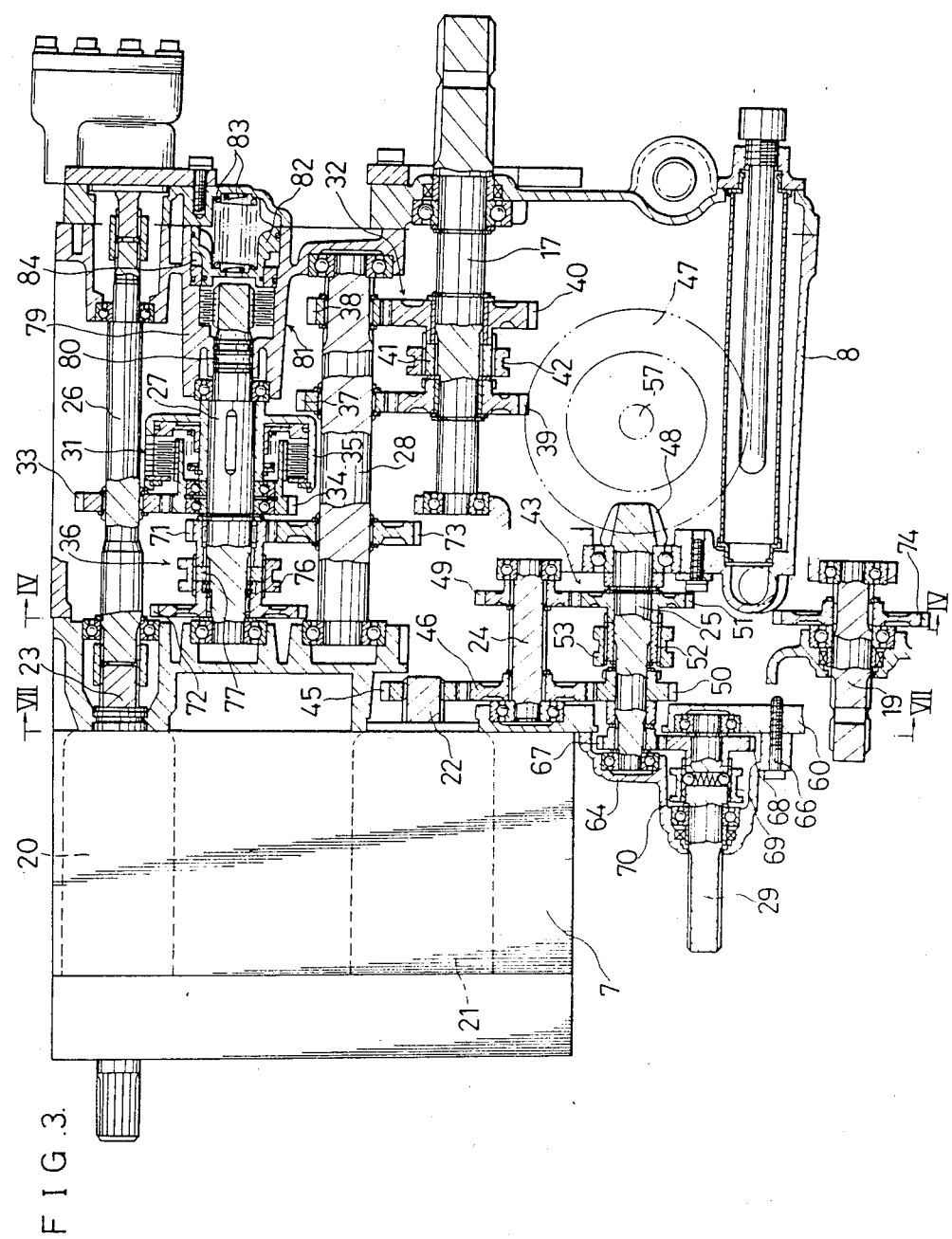
FIG. 3 is a sectional side view, partially developed, of a part of the vehicle shown in FIG. 1.

As shown in FIG. 3, the hydrostatic transmission 7 comprises a hydraulic pump 20 of variable displacement type and a hydraulic motor 21 of fixed displacement type which are arranged in parallel by placing the pump 20 at an upper side. The transmission shown is fashioned such that input of vehicle-travelling power into transmission case 8 is made from the hydraulic motor 21 whereas input of working implement-driving power into case 8 is made from the hydraulic pump 20. For this end, motor shaft of the motor 21 is projected into transmission case 8 as a first input shaft 22 whereas pump shaft of the pump 20 is projected into the case 8 as a second input shaft 23. The first and second input shafts 22 and 23 are thus arranged in parallel and the second input shaft 23 takes a higher level.

Figure 4:
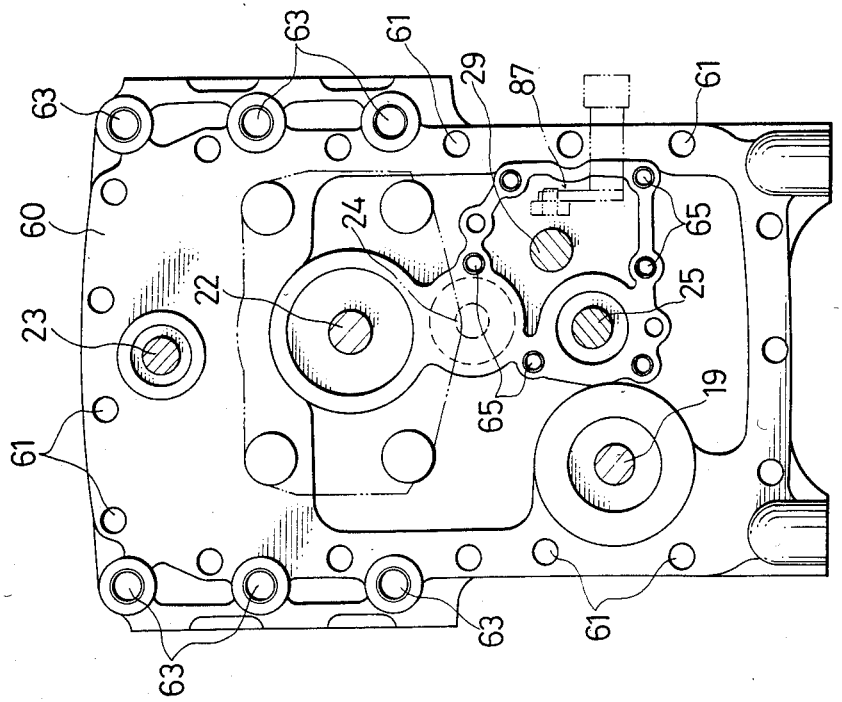
FIG. 4 is a sectional view, partially omitted, taken along line IV—IV of FIG. 3.
Figure 6:
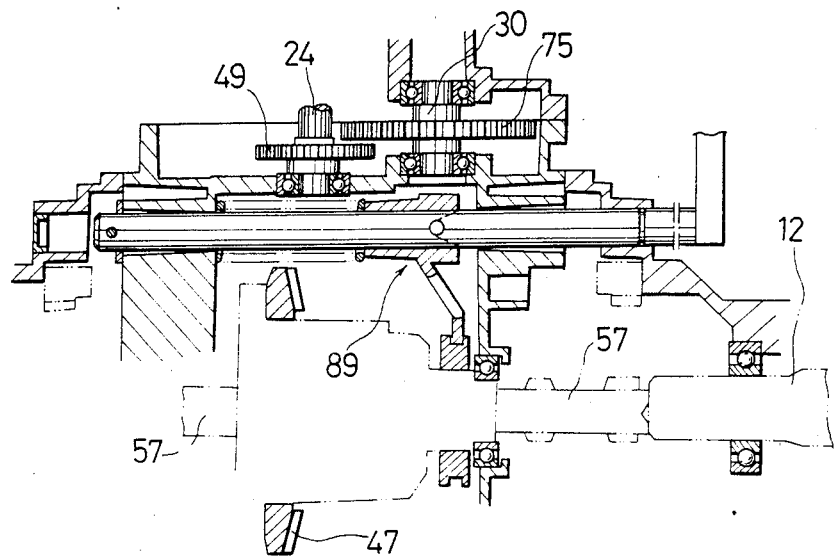
FIG. 6 is a sectional plan view of a part of the vehicle shown in FIG. 1.

As shown in FIGS. 3 and 4, there are provided in the transmission case 8 as transmission shafts for vehicle-travelling power an intermediate shaft 24 and speed-change shaft 25 and as transmission shafts for working implement-driving power a transmission shaft 26, clutch shaft 27 and intermediate shaft 28. These shafts 24 to 28 are in parallel relationship. Each of the shafts 26, 27 and 28 in the PTO transmission line is formed to have a relatively large length such that it occupies almost all of the axial width of the inside of transmission case 8, whereas each of the shafts 24 and 25 in the travelling-power transmission line is formed to have a small length such that it may be positioned only at a fronter location in the inside of transmission case 8. The rear-PTO shaft is arranged in a fashion such that it extends, as seen in the axial direction thereof, from a location near the rear ends of shafts 24 and 25 to a position outside the case 8. The mid-PTO shaft 19 has a length aproximately equal to that of each of the shafts 24 and 25 and is disposed, as seen in the axial direction thereof, near a place where the shafts 24 and 25 are disposed. Transmission case 8 further includes an output shaft 29 of a small length for front wheel-driving power which is arranged at a front portion within the case 8 and is connected to the aforesaid transmission shaft 16 shown in FIGS. 1 and 2 as well as an idler shaft 30 having a very small length as shown FIG. 6 which is incorporated in PTO transmission line. Relationship of arrangement between the shafts referred to above as seen in the vertical direction as well as in the direction across the transmission case can clearly be seen from FIG. 4.

Within the transmission case 8, a PTO-clutch 31 and PTO speed-change mechanism 32 shown in FIG. 3 are arranged between the second input shaft 23 and rear-PTO shaft 17. The PTO-clutch 31 is constructed as fluid-operated clutch in a fashion such that a plurality of one and another frictional elements are slidably but non-rotatably supported respectively by a gear 34 rotatably mounted on the shaft 27 and by a clutch housing 35 fixedly mounted on the shaft 27. Gear 34 is meshed with a gear 33 fixedly mounted on the transmission shaft 26 which is fixedly connected to the second input shaft 23. In front of the PTO-clutch 31, there is provided on the clutch shaft 27 a PTO-exchanging clutch 36 through which the intermediate shaft 28 is driven to rotate by the clutch shaft 27 as will be detailed later. The PTO speed-change mechanism 32 is designed so that it connects the rear-PTO shaft 17 to such intermediate shaft 28 with two-speed ratio. For this end, there are provided between the shafts 28 and 17 a pair of speed-change gear trains which comprise two gears 37 and 38 fixedly mounted on the intermediate shaft 28 and another two gears 39 and 40 rotatably mounted on the rear-PTO shaft 17 and meshed with the former two gears. On a splined collar 41 which is fixedly mounted on the rear-PTO shaft 17 by spline connection is mounted a shifting sleeve 42 which connects one of the gears 39 and 40 selectively to the rear-PTO shaft 17. Clutch housing 35 on the clutch shaft 27 and forwardly arranged gear 37 on the intermediate shaft 28 are particularly separated in location from each other in the longitudinal direction of vehicle so that PTO-clutch mechanism comprising the PTO-clutch 31 and PTO-exchanging clutch 36 is disposed forwardly than the PTO speed-change mechanism 32.

Figure 5:
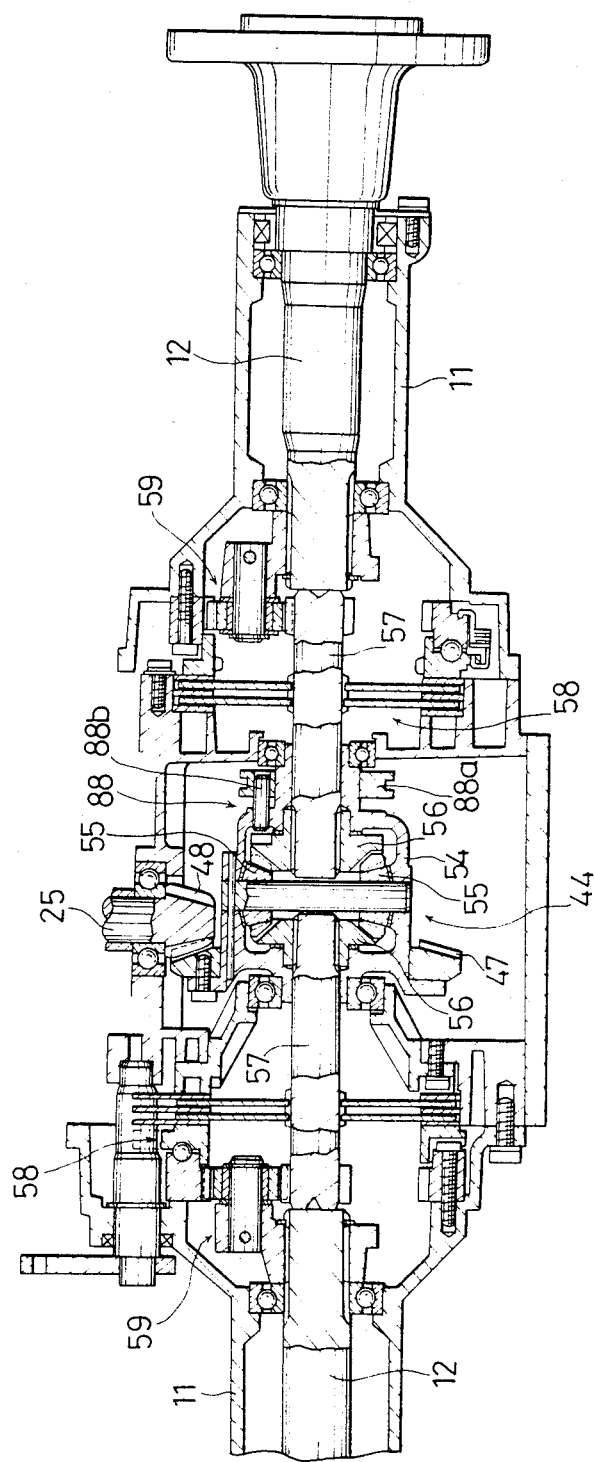
FIG. 5 is a sectional plan view of a part of the vehicle shown in FIG. 1.

Below the PTO-clutch mechanism 31, 36 and speed-change mechanism 32 which are arranged within transmission case 8 at an upper half of such case, a speed-change gearing 43 shown in FIG. 3 and a differential gearing 44 shown in FIG. 5 are provided within the transmission case 8. The speed-change gearing 43 which is arranged below the PTO-clutch mechanism 31, 36, as shown in FIG. 3, is designed so that it connects with two-speed ratio the aforesaid speed-change shaft 25 having at its rearmost end bevel gear 48 of a small size which is meshed with input bevel gear 47 of a large size to the aforesaid intermediate shaft 24 which is driven to rotate by the first input shaft 22 through a gear train having mutually meshed gears 45 and 46. For this end, a further gear 49 is fixedly mounted on the intermediate shaft 24 and gears 46 and 49 on this shaft 24 are meshed respectively with gears 50 and 51 which are rotatably mounted on the speed-change shaft 25. On the speed-change shaft 25 is further mounted via a splined collar 52 between gears 50 and 51 a shifting sleeve 53 which connects one of the gears 50 and 51 selectively to the speed-change shaft 25. Meanwhile, the differential gearing 44 which is arranged below the PTO speed-change mechanism 32 is constructed in a conventional fashion such that, as shown in FIG. 5, a pair of driving pinions 55 and a pair of driven pinions 56 are meshed with one another within a differential casing 54 which is rotatably supported by transmission case 8 and to which the input bevel gear 47 is fixedly attached. In the transmission shown, the aforestated left and right wheel axles 12 are arranged co-axially with left and right output shafts 57. Within each of the left and right axle housing 11 are arranged a disk brake 58 for selectively braking each output shaft 57 and a planetary gearing 59 for operatively connecting each wheel axle 12 to output shaft 57 with a reduced speed of rotation.

As shown in FIG. 3, a frame plate 60 front view of which is shown in FIG. 7 is fixedly secured to the front of transmission case 8. This plate 60 is fastened to the case 8 by means of fastening bolts (not shown) which are threadingly fitted into threaded bores 62 shown in FIG. 4 through holes 61 shown in FIG. 7. As shown in FIG. 7, the frame plate 60 is formed at an upper half thereof with threaded bores 63 which are used for fastening the hydrostatic transmission 7. As can be understood from FIGS. 4 and 7, the output shaft 29 and mid-PTO shaft 19 are arranged at low levels below hydrostatic transmission 7 so that they are disposed within transmission case 8 in an opposite relationship in a direction across the case with the speed-change shaft 25 between.

As shown in FIG. 3, a rear end portion of speed-change shaft 25 is supported by a supporting wall projected from an inner wall of transmission case 8 and a rear end portion of output shaft 29 for the front wheel-driving power is supported by the frame plate 60. A cover 64 which supports front end portions of these shafts 25 and 29 is fixedly secured to the front of frame plate 60 by means of bolts 66 which are fitted into threaded bores 65 shown in FIG. 7. Within this cover 64, gear 67 fixedly mounted on speed-change shaft 25 is meshed with gear 68 which is mounted rotatably on output shaft 29 and is connected selectively to the shaft 29 by a shiftable clutch sleeve 69 on such shaft 29. By this, a front wheel-driving clutch 70 is provided which selectively connects the output shaft 29 drivenly to the speed-change shaft 25.

Figure 8A:
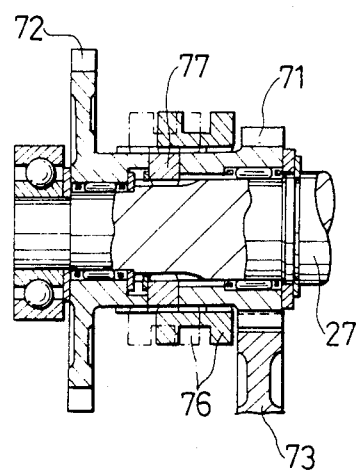
FIG. 8a and 8b are enlarged sectional side views of a part of FIG. 3 but showing another states for illustrating an operation of PTO-clutch mechanism.
Figure 8B:
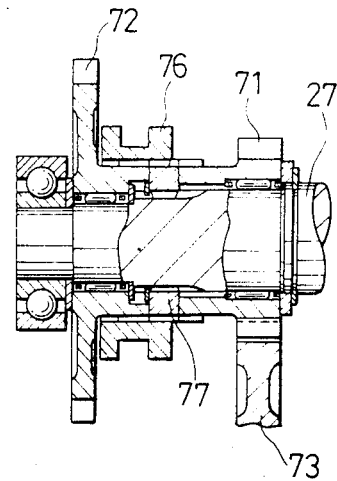

Meanwhile, the mid-PTO shaft 29 which is disposed opposite to the output shaft 19 in the direction across transmission case 8 is connected operatively to the second input shaft 23 as follows: As shown in FIG. 3, the PTO-exchanging clutch 36 comprises a pair of spaced first and second gears 72 and 71 which are rotatably mounted on the clutch shaft 27 in front of the PTO-clutch 31. The second gear 71 is meshed with a gear 73 which is fixedly mounted on the intermediate shaft 28, whereas the first gear 72 which is arranged more forwardly than the second gear is meshed, as shown in FIGS. 4 and 7, with a gear 75 which is mounted on the idler shaft 30 and is in turn meshed with a gear 74 fixely mounted on the mid-PTO shaft 29. On the clutch shaft 27 is further mounted a shiftable clutch sleeve 76 which is slidably but non-rotatably supported by the shaft 27 via a splined collar 77 disposed between the first and second gears 72, 71. Boss of each of the gears 71 and 72 has an extension abutting the collar 77. Such extensions of bosses and the splined collar 77 are formed respectively with axially aligned teeth to which teeth formed on the inner peripheral surface of clutch sleeve 76 may be engaged. The clutch sleeve 76 is designed so that it may be shifted selectively to a position shown in FIG. 3 and also shown in phantom in FIG. 8a where the sleeve 76 is engaged with teeth thereof to teeth of the splined collar 77 as well as to teeth of both of the gears 71, 72 so that both of the first and second gears 72 and 71 are connected to the clutch shaft 27; another position shown in FIG. 8a where the sleeve 76 is engaged with teeth thereof to teeth of the splined collar 77 and second gear 71 so that only the second gear 71 is connected to the clutch shaft 27; and a further position shown in FIG. 8b where the sleeve 76 is engaged with teeth thereof to teeth of the splined collar 77 and first gear 72 so that only the first gear 72 is connected to the clutch shaft 27. Consequently, the PTO-exchanging clutch 36 connects the clutch shaft 27 selectively to both of the rear-PTO shaft 17 and mid-PTO shaft 19 at the position of clutch sleeve 76 shown in FIG. 3, only to the rear-PTO shaft 17 at the position of clutch sleeve 76 shown in FIG. 8a, and only to the mid-PTO shaft 19 at the position of clutch sleeve 76 shown in FIG. 8b. As clearly shown in FIG. 4, gear train consisting of the gears 72, 75 and 74 is disposed within the transmission case 8 at a side toward which the mid-PTO shaft 19 is deviated in position within the case 8. As can be understood now, the mid-PTO shaft 19 is connected operatively to the second input shaft 23 by means of a gear train having the arrangement set forth above and by means of PTO-clutch mechanism 31, 36 including PTO-exchanging clutch 36.

As is usual, it is designed that the PTO-clutch 31 is supplied with clutch-operating fluid via fluid path (not shown) which is formed in the clutch shaft 27. As shown in FIG. 3, a rotary joint portion for communicating such fluid path being rotatable with the shaft 27 to another fluid path fixed in position is formed by sealingly covering an annular groove on the outer peripheral surface of clutch shaft 27 so as to form an annular fluid chamber 80 constituting the rotary joint portion by means of inner peripheral surface of a hollow cylinder 79 which is formed integrally with rear wall of the transmission case 8 in a fashion such that it projects inwardly into the case 8. A brake 81 is also provided on the clutch shaft 27 by employing the hollow cylinder 79 as brake case therefor. This brake 81 is constructed in a fashion such in that a plurality of one and another frictional elements are slidably but non-rotatably supported respectively by the clutch shaft 27 and by the cylinder 79, that spring means 83 is provided which forces the frictional elements via piston 82 so as to cause frictional engagement between the plurality of one and another frictional elements, and that an annular fluid chamber 84 is provided for retreating the piston 82. The fluid chamber 84 is communicated to a fluid path for supplying and draining clutch-operating fluid for the PTO-clutch 31. It is thus seen that the brake 81 does not brake the clutch shaft 27 in the operated state of clutch 31 where fluid is supplied under pressure into the annular fluid chamber 84 resulting in a retreatment of the piston 82, whereas such brake 81 is operated so as to brake the clutch shaft 27 in the non-operated state of clutch 31 where fluid is drained from the chamber 84 resulting in an advance of the piston 82 by the biasing force of spring means 83.

In FIG. 4, numerals 85 and 86 designate respectively operating mechanisms for the speed-change gearing 43 and for the PTO-exchanging clutch 36. In FIG. 7, numeral 87 designates operating mechanism for the front wheel-driving clutch 70. As shown in FIG. 5, the differential gearing 44 is associated with a clutch 88 for selectively eliminating the function of such gearing 44. This clutch 88 comprises a shiftable clutch sleeve 88a which is slidably mounted on the boss portion of differential casing 54 and is selectively shifted by means of operating mechanism 89 shown in FIG. 6 so that a pin 88b attached to the sleeve 88a is engaged to one of the driven pinions 56 so as to connect same non-rotatably to the differential casing 54.

The self-propelled working vehicle shown is used for various working purposes such as reaping operation and earthmoving operation. In such use, the vehicle is travelled at a speed controlled by the hydrostatic transmission which varies such speed indefinitely with a selective reverse of travelling direction and by the speed-change gearing 43 which varies the speed stepwisely. When preferred or required, front wheels 1 are also driven to rotate by engaging the front wheel-driving clutch 70. By using the PTO-exchanging clutch 36, any one of the rear-PTO shaft 17 and mid-PTO shaft 19 or both of them may be driven to rotate so as to drive any one of the mower M shown in FIG. 1 and another working implement such as rotary tiller or mower connected to and drawn by the vehicle or both of such mower M and another working implement. Working implement drawn by the vehicle may be driven selectively at a higher speed or at a lower speed by using the PTO speed-change mechanism 32. Before the mechanically operated PTO-exchanging clutch 36 or PTO speed-change mechanism 32 is handled, the fluid-operated PTO clutch 31 is disengaged by handling a control valve not shown in the drawings. At that time, brake 81 is automatically operated so as to brake the clutch shaft 27 so that inertial rotation of such shaft is terminated quickly. Spring means 83 for actuating the brake 81 is predetermined to have a relatively small biasing force so that such spring means does not prevent a shifting operation of the shifting sleeve 42 or shiftable clutch sleeve 76. Brake 81 also acts in the non-operated state of PTO-clutch 31 to prevent an unexpected transmission of power from the transmission shaft 26 to the clutch shaft 27 which transmission might be caused by a dragging effect of lubricant within the clutch 31.

We claim:

1. In a self-propelled working vehicle, wherein left and right rear wheels are driven by engine through a transmission path including therein before a differential gearing for said rear wheels a hydrostatic transmission and speed-change gearing which are connected in series with each other, and wherein there are provided a mid-PTO shaft for driving a working implement of mid-mount type and a rear-PTO shaft for driving a working implement drawn by the vehicle, a transmission for transmitting power from the engine to said rear wheels and to said PTO shafts, characterized in: that there is provided between said left and right rear wheels a transmission case which supports rotatably at left and right sides thereof the said wheels and which journals said PTO shafts in a fashion such that said mid-PTO shaft extends forwardly from said case at a low level thereof whereas said rear-PTO shaft extends backwardly from said case at a middle level thereof; that said hydrostatic transmission is fixedly arranged on the front of said transmission case at a level above said mid-PTO shaft in a fashion such that hydraulic pump thereof driven by the engine is disposed above hydraulic motor driven by said pump, shafts of said pump and motor being projected into said transmission case; that said speed-change gearing and differential gearing are arranged so as to connect wheel axles of said rear wheels operatively to said motor shaft within said transmission case at a lower half thereof in a fashion such than the former gearing is disposed more forwardly than the latter gearing; and that a PTO-clutch mechanism for selectively continuing and discontinuing transmission of power to said PTO shafts and a speed-change mechanism for said rear-PTO shaft are arranged within said transmission case at an upper half thereof in a fashion such that the former mechanism is disposed more forwardly than the latter mechanism, said PTO-clutch mechanism being drivenly connected to said pump shaft and said mid-PTO shaft and said speed-change mechanism being drivenly connectedly respectively to said PTO-clutch mechanism.

2. The transmission as claimed in claim 1, characterized in that said PTO-clutch mechanism includes on a clutch shaft a first clutch for selectively discontinuing the input of power to said clutch shaft and a second clutch for selectively connecting any one or both of said PTO shafts to said clutch shaft, said second clutch being disposed more forwardly than said first clutch.

3. The transmission as claimed in claim 2, characterized in that said second clutch includes on said clutch shaft first and second gears at least one of which is selectively connected to the said clutch shaft, said first gear being disposed more forwardly than said second gear and being drivingly connected to said mid-PTO shaft through a gear train and said second gear being drivingly connected to said speed-change mechanism.

4. The transmission as claimed in claim 3, characterized in that an intermediate shaft on which a gear meshed with said second gear is fixedly mounted is provided within said transmission case in a fashion such that it is disposed at a level approximately equal to the level of said clutch shaft but is separated from the said shaft in a direction across said transmission case, said speed-change mechanism being arranged between said intermediate shaft and said rear-PTO shaft.

5. The transmission as claimed in any one of claims 1 to 4, characterized in that an output shaft for front wheel-driving power is provided within said transmission case in a fashion such that it is disposed opposite to said mid-PTO shaft in a direction across said transmission case with speed-change shaft of said speed-change gearing between and such that it extends forwardly from said transmission case at a level below said hydrostatic transmission, said output shaft being connected operatively to said speed-change shaft through a clutch means.

* * * * *